United States Patent [19]

Stoub

[11] Patent Number: 4,593,189
[45] Date of Patent: Jun. 3, 1986

[54] PROXIMITY DETECTOR FOR A BODY SCANNER

[75] Inventor: Everett W. Stoub, Villa Park, Ill.

[73] Assignee: Siemens Gammasonics, Inc., Des Plaines, Ill.

[21] Appl. No.: 549,935

[22] Filed: Nov. 9, 1983

[51] Int. Cl.$^4$ ............... G01T 1/20; G01V 9/04
[52] U.S. Cl. ................... 250/221; 250/363 S
[58] Field of Search ........... 250/221, 363 SR, 363 SB, 250/363 SC, 363 SF, 363 SG; 340/555–557, 573

[56] References Cited

U.S. PATENT DOCUMENTS

| 4,158,776 | 6/1979 | Barrett. | |
|---|---|---|---|
| 4,239,961 | 12/1980 | Lasar | 250/221 |
| 4,347,438 | 8/1982 | Spielman | 250/221 |
| 4,417,143 | 11/1983 | Haas et al. | 250/363 S |
| 4,438,335 | 3/1984 | Meeder | 250/363 SC |
| 4,507,557 | 3/1985 | Tsikos | 250/221 X |

FOREIGN PATENT DOCUMENTS 0092437 10/1983 European Pat. Off. .

OTHER PUBLICATIONS

Patent Abstracts of Japan, vol. 6, No. 156 (P-135) (1034), Aug. 17, 1982, & JP-A-57 73 688 (Toukiyou Seimitsu K.K.) (8-5-1982).
Patent Abstracts of Japan, vol. 6, No. 41 (P-106) (919), Mar. 13, 1982, & JP-A-56 158 977 (Mitsubishi Denki K.K.).

Primary Examiner—Edward P. Westin
Attorney, Agent, or Firm—Mark H. Jay

[57] ABSTRACT

A proximity detector is provided for a body scanner having a scanning surface. It comprises an energy beam emitting and receiving device in front of the scanning surface of the body scanner for an energy beam projected in a plane parallel to the scanning surface. A signal generator is connected with the energy beam emitting and receiving device for generating a proximity signal when the energy beam becomes weakened or interrupted. The energy beam is preferably a light beam.

24 Claims, 6 Drawing Figures

PROXIMITY DETECTOR FOR A BODY SCANNER

BACKGROUND OF THE INVENTION

1. Field of the Invention

The invention relates to a proximity detector for a body scanner having a scanning surface. The body scanner may for example be an x-ray computed tomography system. It may also be an ultrasound body scanner. In particular this invention relates to a proximity detector for an Anger-type scintillation gamma camera which is adapted for emission computerized tomography (ECT).

2. Description of Prior Art

U.S. Pat. No. 4,158,776 (Barret) described a patient sensing and indicating arrangement for a computed tomography system, wherein the patient has to be centered within a reconstruction circle of a rotating cylindric body scanner. The arrangement comprises a set of three light emitting sources projecting light beams in a plane which is perpendicular to both the cylindric scanning surface of the body scanner and the cranial-caudal axis of the patient. The attachment also comprises three light sensors for the projected light beams. Three independent light beams generally define three sides of a square having sides of a certain length. When the arrangement rotates these three light beams define a circle having a diameter according to the side lengths of the square. This circle is the reconstruction circle in which the patient has to be centered. Due to decentering of the patient any of the light beams will be interrupted. Thus, a signal can be produced to indicate that the patient is not in a correct central position.

In the case of U.S. Pat. No. 4,158,776 the cylindric body scanner always rotates around an axis which has a fixed distance with respect to the scanning surface of the body scanner. To make this fixed axis coincident with the patient's cranial-caudal axis the patient has to be centered. However, very often, particularly in ECT scintillation gamma camera scanning, scanning surface of the body scanner is not fixed with respect to a central axis. In contrast to U.S. Pat. No. 4,158,776 it is desired to make the distance between scanning surface of the body scanner and the patient's body variable, as to adapt rotation of the body scanner around the patient's body as closely as possible to the body structure. The proximity detector as described in U.S. Pat. No. 4,158,776 is no longer useful. A typical ECT scintillation gamma camera is for example taught in U.S. Pat. No. 4,417,143.

SUMMARY OF THE INVENTION

1. Objects

It is an object of this invention to provide an improved proximity detector for a body scanner the distance of which with respect to a body under investigation is variable.

It is another object of this invention to provide such a proximity detector for an ECT scintillation gamma camera.

2. Summary

According to this invention a proximity detector is provided for a body scanner having a scanning surface, comprising (a) an energy beam emitting and receiving device in front of the scanning surface of the body scanner for a set of energy beams projected in a plane parallel to the scanning surface; and (b) a signal generator connected with the energy beam emitting and receiving device for generating a proximity signal when an energy beam becomes weakened or interrupted.

The invention allows automatic, close proximity placement of a body scanner to a body under investigation with speed and safety, without making it necessary to previously center the body in a special way. Thus a special utility is provided for optimal non-circular orbits applications and for greatly simplified patient positioning. In particular, this invention is especially advantageous for ECT scintillation gamma camera scanning.

In a preferred embodiment of the invention the energy beam emitting and receiving device comprises (a) a reflector ring in front of the scanning surface of the body scanner;

(b) an energy beam emitter for projecting an energy beam into the reflector ring; and (c) an energy beam receiver for the energy beam reflected from the reflector ring.

The foregoing and other objects, features and advantages of the invention will be apparent from the following more particular description of preferred embodiments of the invention, as illustrated in the accompanying drawings.

DESCRIPTION OF THE PREFERRED EMBODIMENT

Figure 1:
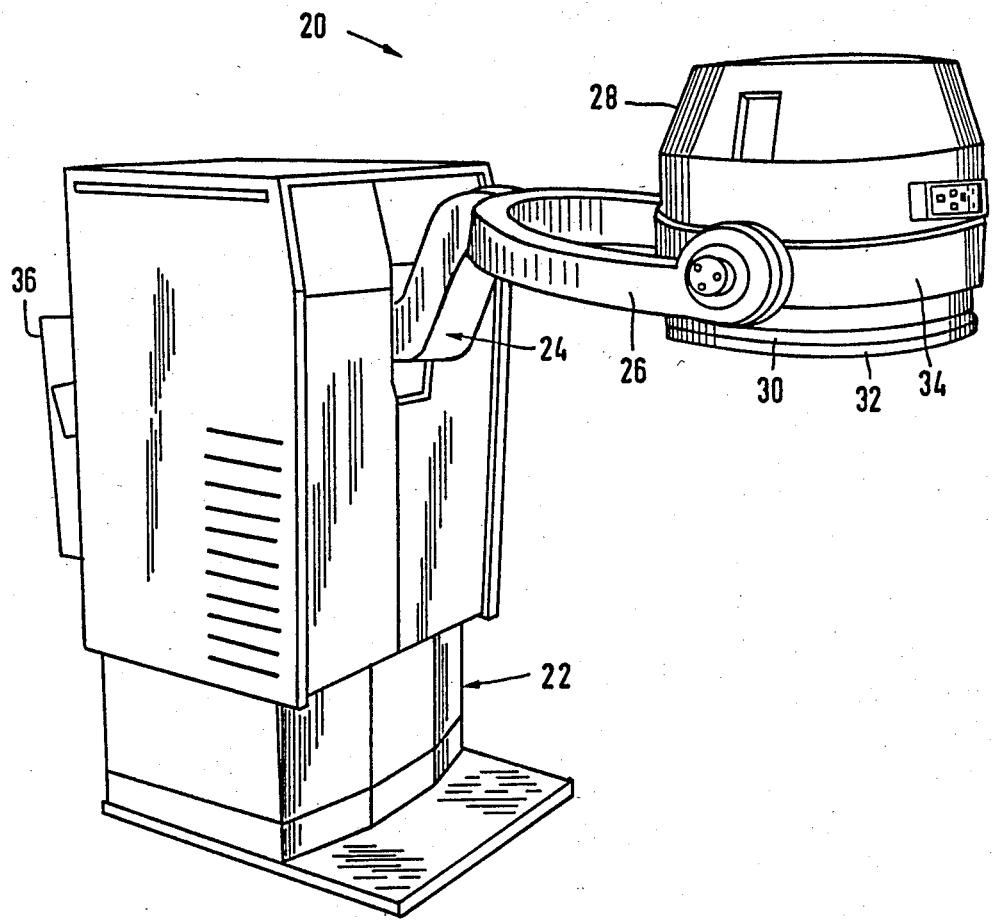
FIG. 1 is an overall perspective view of an ECT scintillation gamma camera comprising the invention.

The ECT scintillation gamma camera of FIG. 1 is for example similar to this one which is described in the commonly-owned, copending patent application Ser. No. 273,446 of Haas et al., entitled "Improved Apparatus for Driving a Radiation Detector", which was filed June 15, 1981. As shown in FIG. 1, the Anger-type camera 20 includes a base 22 on which is mounted a support arm 24 including a yoke portion 26. A detector head 28, including a collimator 30 and a proximity detector 32 according to the invention is pivotally mounted between the bifurcated ends of the yoke 26 by means of a detector head trunnion ring 34. A counterweight 36 is carried at the end of the support arm 24 opposite to the yoke portion 26 and serves the purpose of balancing the moment of the weight of the detector head 28 about the point of attachment of the support arm 24 to the base 22. As described in the copending patent application Ser. No. 273,446, the arm 24 is mounted atop the base 22 to drive the detector head 28 in a precessing orbit about a patient (for example, about the cranial-caudal axis of the patient), with the detector head 28 in a preset pivotal position α with respect to the yoke 26 for desired orientation of the face of the head 28 with respect to the patient.

According to this invention a dense set of light beams, as produced by optical lasers for example, can be arranged to cover the face of the detector head, in close proximity to the collimator surface, so that each small region (e.g. an inch square) is traversed by at least one light beam.

Figure 2:
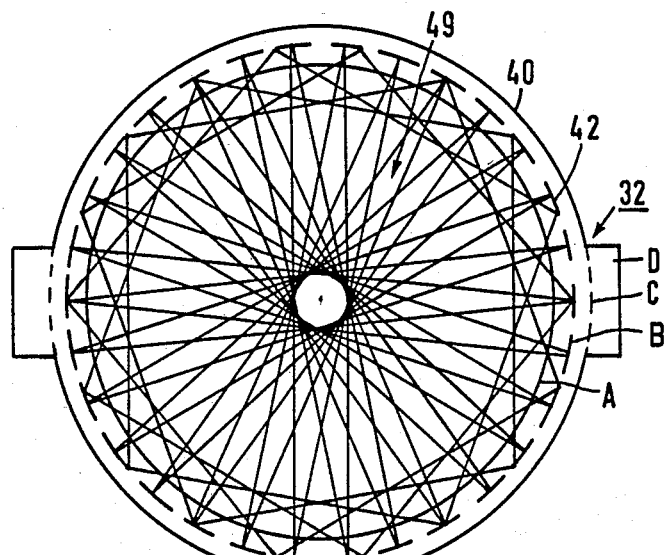
FIG. 2 is a top view of the scintillation gamma camera head of the ECT camera of FIG. 1 comprising the invention.
Figure 3:
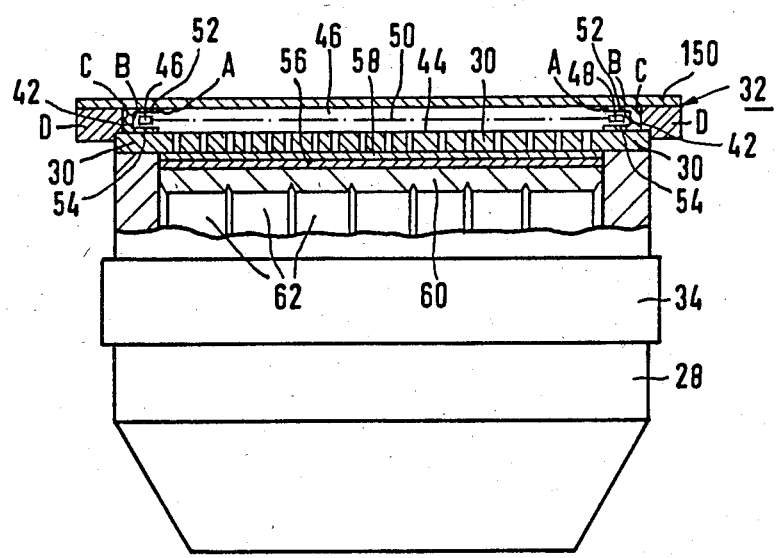
FIG. 3 is a partially sectional side view of the scintillation gamma camera head of FIG. 1 comprising the invention.

The sketch of such a device is shown in FIGS. 2 and 3. According to FIGS. 2 and 3 the proximity detector 32 comprises a reflector ring 40 having an inner reflecting surface 42 which is perpendicular to the scanning surface 44 of the detector head 28 (in this case the front surface of the collimator 30). A light beam emitting and receiving device, as indicated by 46 and 48 in FIG. 3, produces a dense set 49 of light beams, all coplanar, in a plane 50 parallel to the scanning surface 44 of the detector head.

As illustrated in FIG. 3 the reflector ring 40 is U-shaped in cross section, wherein the bottom wall of the U forms the inner reflecting surface 42. The protruding side walls 52, 54 form a shield or baffle for straying light. The reflector ring 40 is a metal (e.g. aluminum) ring which has an inner layer of silver as the reflecting surface 42.

The detector ring 40 may be attached to the collimator 30 by means of screws (now shown).

FIG. 3 depicts also in a partially sectional view the interior structure of the detector head 28, namely a scintillation crystal 56 having a frontal aluminum cover 58 and a light pipe 60, bearing an array of N photomultiplier tubes 62.

Figure 4:
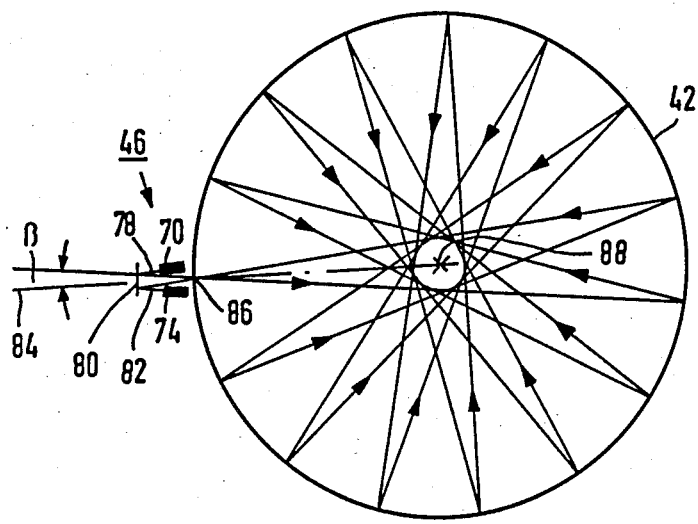
FIG. 4 is a first light beam emitting and receiving device used for the invention.
Figure 5:
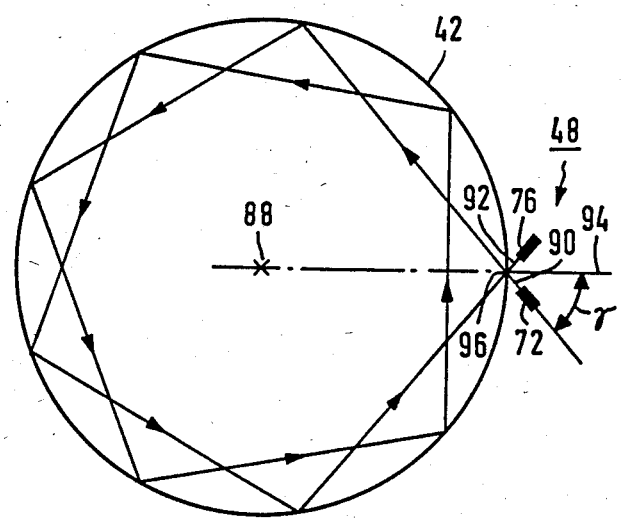
FIG. 5 is a second light beam emitting and receiving device used for the invention.

As illustrated in FIGS. 4 and 5 the dense set 49 of light beams can be generated by means of two light emitters 70 and 72 (laser diodes) and two light receivers (photodetectors) 74 and 76.

In the case of FIG. 4 first light emitter 70 projects a light beam 78 against a flat mirror 80. From there the light beam is projected into the reflfector ring 40. After a certain number of reflections (as shown in FIG. 4) at the reflecting surface 42 of the reflector ring 40 the reflected beam 82 impinges again at flat mirror 80 and is from there reflected to light receiver 74. The entrance angle $\beta$ of the light beam 78 into the reflector ring 40 is about $\beta = 6°$ with reference to a line 84 drawn from the beam entrance point 86 to the center 88 of the reflector ring. First light emitter 70 and first light receiver 74 are located at the reflector ring 40 in close vicinity on both sides of drawn line 84 with the latter one as a symmetry axis.

In the case of FIG. 5, the second light emitter 72 projects a light beam 90 into the reflector ring 40. The reflected light beam which is received by light receiver 76 is indicated with 92. The angle $\gamma$ of projected light beam 90 with respect to a line 94 drawn from the beam entrance point 96 to the center 88 of the reflector ring is now about $\gamma = 50°$. Due to this relatively large angle $\gamma$ in FIG. 5 the set of light beams generated in the inner of the reflector ring covers essentially the external zones of the inner ring area while in FIG. 4 due to the relatively small angle $\beta = 6°$ the set of light beams covers essentially the center zone of the inner ring area.

By superimposing both beam sets of FIGS. 4 and 5 a dense set of light is created as indicated in FIG. 1.

In FIG. 5 similar to FIG. 4, light emitter 72 and light receiver 76 are located at the reflector ring on both sides of line 90 with the latter one as symmetric axis. However, the light emitting and receiving device 48 in FIG. 5 compared with the light emitting and receiving device 46 in FIG. 4 is located on the opposite side of the reflector ring.

Figure 6:
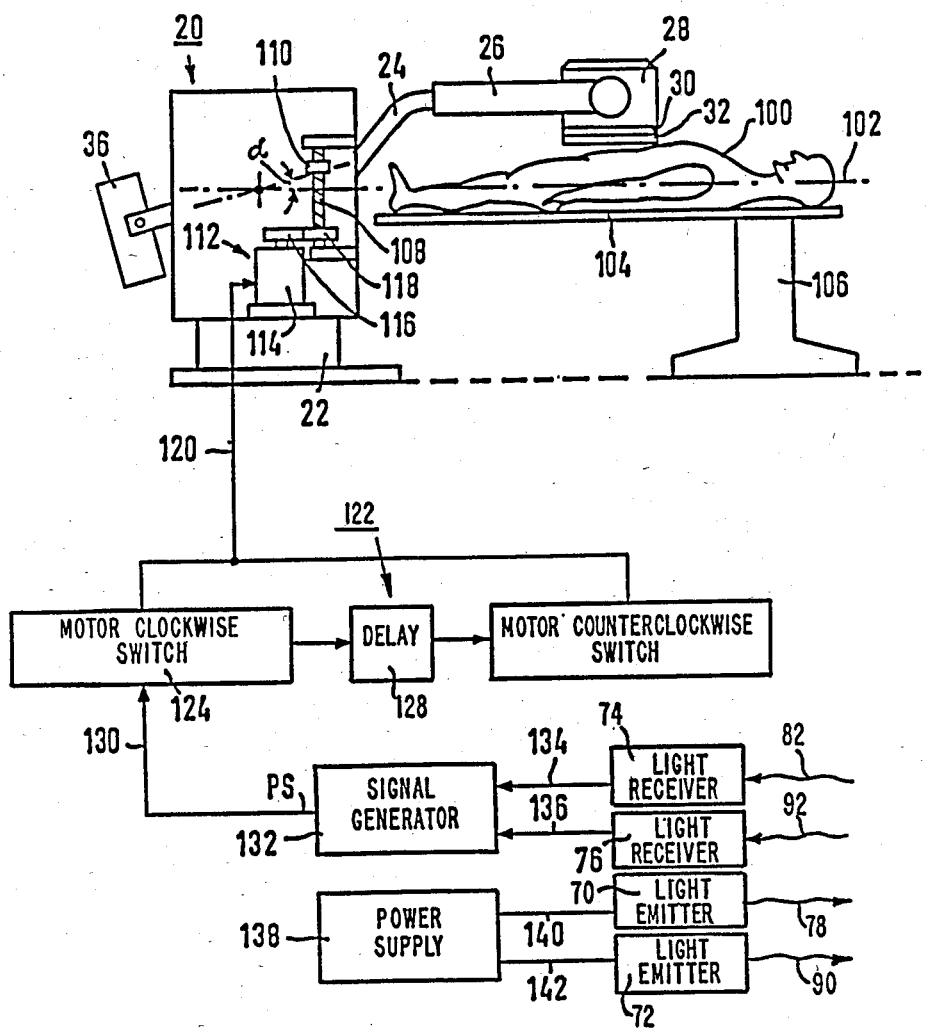
FIG. 6 is a block circuit diagram of the invention.

In FIG. 6 a patient 100 with cranial-caudal axis 102 is positioned on a couch 104 having a base 106. Similar to the ECT scintillation gamma camera which is described in the commonly-owned, copending patent application Ser. No. 273,446 the ECT scintillation gamma camera shown in FIG. 6 comprises an acme screw 108 and an acme nut 110 for presetting the pivotal position (tilt angle $\alpha$) of the detector head 28 with respect to the cranial-caudal axis 102 of the patient.

However, in accordance with this invention the acme screw 108 comprises a motor drive 112 (motor 114, motor gear wheel 116 and acme screw gear wheel 118) which is connected via control line 120, power switch circuit 122 (power switch 124 for motor clockwise rotation, power switch 126 for motor counterclockwise rotation and delay member 128) and control line 130 with the output of a signal generator 132. Signal generator 132, which is connected with the light receivers 74 and 76 of the light emitting and receiving devices 46 and 48 of the proximity detector 32 via lines 134 and 136, respectively generates a proximity signal PS when an energy beam of the set 49 of beams of the proximity detector becomes weakened or interrupted.

This normally happens as a response at an intrusion of any non-transparent or optically refractive material into the plane 50 of the light beams in the inner area of the reflector ring 40. Thus, also the intrusion of parts of the patient's body in the plane of light beams will change the amount of light being detected by a measurable amount. Due to this signal generator 132 will produce a proximity signal PS. Dependent on the proximity signal PS power switch 124 will control motor 114 via control line 120 to clockwise rotation. Thereupon, acme screw 108 will rotate clockwise, thereby increasing tilt angle $\alpha$.

Thus, detector head 28 of the ECT scintillation gamma camera will adjust the orbit radius for a larger radius, so as to withdraw the camera head from the intruding part of the patient's body. The rate of withdrawal will accelerate until the intrusion is no longer detected. A certain amount of time (e.g. 5 to 10s) upon detection of no more intrusion, which time may be preset by the delay time of the delay member 128, the power switch 126 will switch the motor 114 for counterclockwise rotation. Thereupon, the acme screw 108 will rotate in counterclockwise direction so that tilt angle $\alpha$ will decrease. Orbit radius of the detector head 28 will become smaller, so as to again approach the surface of the patient's body. The rate of approach will be preset for safety, so as to prevent noticeable overshoot in approach. These two control modes, withdrawal and approach, will function as a feedback control for maintaining the patient's body surface in virtual contact with the plane of the set of light beams. In ECT, during rotation, the camera head will be seen to track the surface of the patient's body and thereby obtain optimum resolution at all viewing angles.

In FIG. 6 there is also shown a power supply 138 for the light emitters 70, 72 which is connected with light emitter 70 via line 140 and with light emitter 72 via line 142.

The signal generator 132 in the present case comprises a threshold detector (not shown) which at the disappearance of an input signal at line 134 and/or 136 generates a proximity signal PS.

If desired the open front plane of the reflector ring 40 of the proximity detector 32 can be protected by a deflectable screen 150 stretched across the front plane as indicated in FIG. 3. This deflectable screen would occlude light en route to the light receivers upon contact with an intruder. Having thus described the invention with particular reference to the preferred forms thereof, it will be obvious to those skilled in the art to which the invention pertains, after understanding the invention, that various changes and modifications may be made therein without department from the spirit and scope of the invention as defined by the claims appended hereto.

What is claimed is:

1. A proximity detector for a body scanner having a scanning surface, comprising:
   (a) an energy beam emitting and receiving device in front of the scanning surface of the body scanner for a dense set of discrete energy beams projected along fixed directions in a plane parallel to the scanning surface, including
      (a1) a circular reflector ring in front of the scanning surface of the body scanner;
      (a2) a first energy beam emitter for projecting a first energy beam into the reflector ring in said energy projection plane along a first line which forms a first angle with a line drawn between the entrance point of the first energy beam into the reflector ring and the center of the reflector ring, thereby generating a first set of energy beams inside the reflector ring due to a number of reflections;
      (a3) a second energy beam emitter for projecting a second energy beam into the reflector ring in said energy projection plane along a second line which forms a second angle with a line drawn between the entrance point of the second energy beam into the reflector ring and the center of the reflector ring, said second angle being different from said first angle, thereby generating a second set of energy beams inside the reflector ring due to another number of reflections, said first and second sets of energy beams being superimposed to form said dense set of discrete energy beams;
      (a4) an energy beam receiver for an energy beam from the superimposed first and second sets of energy beams reflected out from the reflector ring; and
   (b) a signal generator connected with the energy beam receiver for generating a proximity signal when at least one energy beam from said set of discrete energy beams becomes weakened or interrupted.

2. A proximity detector for a body scanner having a scanning surface, comprising:
   (a) an energy beam emitting and receiving device in front of the scanning surface of the body scanner for a dense set of discrete energy beams projected along fixed directions in a plane parallel to the scanning surface, including
      (a1) a circular reflector ring in front of the scanning surface of the body scanner;
      (a2) an energy beam emitter for projecting an energy beam into the reflector ring, thereby generating said set of discrete energy beams inside the reflector ring due to a number of reflections;
      (a3) an energy beam receiver for an energy beam from said set of discrete energy beams reflected out from the reflector ring; and
   (b) a signal generator connected with the energy beam receiver for generating a proximity signal when at least one energy beam from said set of discrete energy beams becomes weakened or interrupted.

3. A proximity detector according to claim 2, wherein
   (a) the reflector ring comprises an inner reflecting surface which is perpendicular to the scanning surface of the body scanner; and
   (b) the energy beam emitter projects the energy beam into the reflector ring such that it perpendicularly impinges upon the reflecting surface of the reflector ring.

4. A proximity detector according to claim 3, wherein the energy beam emitter is located at the reflector ring in said energy beam projection plane.

5. A proximity detector according to claim 4, wherein the energy beam receiver is located at the reflector ring in said energy beam projection plane.

6. A proximity detector according to claim 5, wherein the energy beam emitter and the energy beam receiver are located in close vicinity to each other at the reflector ring.

7. A proximity detector according to claim 2, wherein
   (a) the reflector ring has a center in said energy beam projection plane; and
   (b) the energy beam emitter projects said energy beam in said energy beam projection plane along a line, which forms an angle with a line drawn between the entrance point of the energy beam into the reflector ring and the center of the reflector ring.

8. A proximity detector according to claim 2, wherein the energy beam emitting and receiving device comprises two energy beam emitters, wherein one beam emitter projects a first energy beam in said energy projection plane along a first line which forms a first angle with a line drawn between the entrance point of the first energy beam into the reflector ring and the center of the reflector ring and another beam emitter projects a second energy beam in said energy projection plane along a second line which forms a second angle with a line drawn between the entrance point of the second energy beam into the reflector ring and the center of the reflector ring, said second angle is different from said first angle.

9. A proximity detector according to claim 8, wherein the first angle is less than 10°.

10. A proximity detector according to claim 8, wherein the second angle is more than 45°.

11. A proximity detector according to claim 9, wherein the first angle is 6°.

12. A proximity detector according to claim 10, wherein the second angle is 50°.

13. A proximity detector according to claim 8, wherein the first and second energy beam emitters are located on opposite sides at the reflector ring.

14. A proximity detector according to claim 7, wherein the energy beam emitter and the energy beam receiver are located at the reflector ring on opposite sides of said drawn line with said drawn line as a symmetry axis.

15. A proximity detector according to claim 3, wherein the reflector ring comprises an inner circular groove the bottom of which forms an inner reflecting surface for the energy beam.

16. A proximity detector according to claim 15, wherein the reflector ring is U-shaped in cross section, wherein
(a) the bottom wall of the U forms said inner reflecting surface; and
(b) the protruding side walls of the U form a baffle for straying energy.

17. A proximity detector according to claim 2, wherein the reflector ring is a metal ring.

18. A proximity detector according to claim 17, wherein the reflector ring is made of aluminum having an inner layer of silver as a reflecting surface.

19. A proximity detector according to claim 2, wherein the energy beam emitting and receiving device is a light beam emitting and receiving device.

20. A proximity detector according to claim 2, wherein the body scanner comprises
(a) means for adjusting the distance between the scanning surface and body under investigation; and
(b) means connected with the signal generator and said adjusting means for controlling the adjusting means to vary the distance between scanning surface of the body scanner and the body under investigation dependent on the proximity signal of the signal generator.

21. A proximity detector according to claim 2, wherein the body scanner is the detector head of a gamma scintillation camera.

22. A proximity detector according to claim 21, wherein the body scanner is the detector head of an ECT gamma scintillation camera.

23. A proximity detector according to claim 2, wherein the body scanner comprises a collimator, further comprising means for attaching the proximity detector in front of said collimator.

24. A proximity detector according to claim 2, comprising a deflectable screen stretched across the reflector ring in front of the set of energy beams for occluding energy of the energy beam en route to the energy beam receiver upon contact with an intruder.

* * * * *